(12) United States Patent
Haupts

(10) Patent No.: US 10,507,831 B2
(45) Date of Patent: Dec. 17, 2019

(54) CRUISE CONTROL SYSTEM FOR A MOTOR VEHICLE

(71) Applicant: FORD GLOBAL TECHNOLOGIES, LLC, Dearborn, MI (US)

(72) Inventor: Volker Haupts, Nordrhein-Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/848,577

(22) Filed: Dec. 20, 2017

(65) Prior Publication Data

US 2018/0194351 A1 Jul. 12, 2018

(30) Foreign Application Priority Data

Jan. 9, 2017 (DE) .................. 10 2017 200 190

(51) Int. Cl.
*B60W 30/14* (2006.01)
*B60K 31/00* (2006.01)
*B60W 30/188* (2012.01)
*B60W 40/076* (2012.01)
*B60W 30/18* (2012.01)

(52) U.S. Cl.
CPC ........... *B60W 30/143* (2013.01); *B60K 31/00* (2013.01); *B60W 30/188* (2013.01); *B60W 30/18009* (2013.01); *B60W 40/076* (2013.01); *B60W 2520/10* (2013.01); *B60W 2710/0627* (2013.01); *B60W 2720/10* (2013.01)

(58) Field of Classification Search
USPC .......................................................... 701/93
See application file for complete search history.

(56) References Cited

U.S. PATENT DOCUMENTS

| 2004/0084237 A1* | 5/2004 | Petrie, Jr. ............... | B60K 31/04 180/170 |
| 2007/0265759 A1* | 11/2007 | Salinas .................... | B60T 7/16 701/93 |
| 2008/0022969 A1* | 1/2008 | Frenz ................ | B60W 30/1882 123/347 |

(Continued)

FOREIGN PATENT DOCUMENTS

| DE | 10205226 A1 | 8/2003 |
| DE | 102008061392 A1 | 2/2010 |

*Primary Examiner* — Tyler D Paige
(74) *Attorney, Agent, or Firm* — Brooks Kushman P.C.; Frank Lollo

(57) ABSTRACT

A cruise control system controls fuel supplied to an engine of a motor vehicle based in part on whether the vehicle is travelling on a positive gradient, a negative gradient, or a level surface. The system includes a sensor for detecting a position of an accelerator pedal of the vehicle, an inclinometer for detecting a gradient of a surface over which the vehicle is traveling; and an electronic processor operative to set a fuel flow rate. The fuel flow rate is set as a function of the accelerator pedal position detected at an activation time of the cruise control system, and that fuel flow rate is maintained at a constant rate if the vehicle is travelling on a positive gradient or a level surface. The vehicle therefore slows down on the positive gradient rather than maintaining a target speed as with a conventional cruise control system.

18 Claims, 2 Drawing Sheets

(56) References Cited

U.S. PATENT DOCUMENTS

| | | | | |
|---|---|---|---|---|
| 2011/0276216 A1* | 11/2011 | Vaughan | ............... | B60W 10/06 |
| | | | | 701/31.4 |
| 2013/0261846 A1* | 10/2013 | McQuade | ............... | G06F 17/00 |
| | | | | 701/2 |
| 2013/0261907 A1* | 10/2013 | McQuade | ........... | F02D 41/2425 |
| | | | | 701/51 |
| 2015/0258994 A1* | 9/2015 | Kidambi | ............... | B60W 30/16 |
| | | | | 701/87 |
| 2018/0194351 A1* | 7/2018 | Haupts | ................ | B60W 30/143 |

* cited by examiner

CRUISE CONTROL SYSTEM FOR A MOTOR VEHICLE

CROSS-REFERENCE TO RELATED APPLICATIONS

This application claims foreign priority benefits under 35 U.S.C. § 119(a)-(d) to DE Application 10 2017 200 190.9 filed Jan. 9, 2017, which is hereby incorporated by reference in its entirety.

TECHNICAL FIELD

The invention relates to a cruise control system a motor vehicle having an internal combustion engine, and to such a system that controls fuel flow to the engine depending on whether the motor vehicle is traveling over a positive gradient, a negative gradient or a level surface.

BACKGROUND

A cruise control system is conventionally used in a motor vehicle with an internal combustion engine operative to maintain a set speed of the motor vehicle. If the motor vehicle is traveling over a level surface, that is to say a surface having neither a positive (climbing) nor negative (descending) gradient, with the cruise control system activated, a constant quantity of fuel is generally fed to the internal combustion engine. If the motor vehicle is traveling over a positive gradient, the cruise control system feeds a relatively large mass flow of fuel to the internal combustion engine, in order to adjust the speed of the motor vehicle to the set speed. As a result, the consumption of fuel is increased. If the motor vehicle is traveling over a negative gradient, the cruise control system supplies the internal combustion engine with a relatively small mass flow of fuel, in order to adjust the speed of the motor vehicle to the set speed by means of engine braking.

DE 102 05 226 A1 and DE 10 2008 061 392 A1 relate to a cruise control systems for motorvehicles.

SUMMARY

An object of the invention is to reduce the consumption of fuel of a motor vehicle which has an internal combustion engine and a cruise control system.

According to a method disclosed herein for operating a motor vehicle with an internal combustion engine and a cruise control system, it is detected electronically whether the motor vehicle is traveling over a positive gradient, a negative gradient or a level surface, and the cruise control system supplies the internal combustion engine with a constant mass flow of fuel if the motor vehicle is traveling over a positive gradient or a level surface. An instantaneous position of an accelerator pedal of the motor vehicle is detected, and the constant mass flow of fuel is set as a function of (based on) a position of the accelerator pedal which is detected at the time of activation of the cruise control system.

Instead of an instantaneous speed of the motor vehicle, an instantaneous position of the accelerator pedal at activation of the cruise control system is detected as a decisive parameter for the cruise control system. The instantaneous position of the accelerator pedal is usually detected electronically and can be made available to the cruise control system via vehicle electronics and/or a vehicle sensor system. The instantaneous pedal position can be detected, for example, in the form of a percentage value, the instantaneous position of the unloaded accelerator pedal being assigned the percentage value 0, and an instantaneous open throttle position of the accelerator pedal being assigned the percentage value<100 outside a kickdown percentage value range. In addition, an accelerator pedal characteristic diagram can be used if the accelerator pedal travel is not proportional to an accelerator level travel. However, this is irrelevant for the present invention, since a driver has selected a specific velocity by means of the respective instantaneous accelerator pedal position.

If the motor vehicle is traveling over a positive gradient and if the internal combustion engine is supplied with the constant mass flow of fuel in accordance with the position of the accelerator pedal which is detected at activation of the cruise control system, the velocity of the motor vehicle is reduced due to the force of gravity acting on the vehicle. However, the consumption of fuel of the motor vehicle remains constant. The motor vehicle therefore behaves in the same way as the case in which a driver undertakes a long journey on a freeway without automated cruise control, the driver usually keeping the accelerator pedal more or less in the same position, with the result that the motor vehicle becomes slower on a positive gradient. As a result of the slowing down of the motor vehicle on a positive gradient, an unexpected or sudden approach of the motor vehicle to motor vehicles traveling ahead on the positive gradient is additionally attenuated, which improves the driving comfort of the motor vehicle. If the motor vehicle is traveling over a level surface (having zero gradient or change of elevation) with the cruise control system activated, the motor vehicle maintains the velocity selected by the driver by means of the accelerator pedal.

The electronic detection of whether the motor vehicle is traveling over a positive gradient, a negative gradient or a level surface can be carried out by means of an inclinometer which is part of vehicle electronics connected to the cruise control system or by means of an inclinometer of the cruise controller itself. For example, empirical data, stored in an engine controller of the motor vehicle, with constant driving conditions can be compared with the instantaneous velocity, the instantaneous accelerator pedal position, the acceleration rate and additionally with data of a vehicle movement dynamics control system, which data indicates the instantaneous incline of the motor vehicle. The instantaneous position of an accelerator pedal can be detected by means of a vehicle sensor system connected to the cruise control system or by means of a corresponding control device of the cruise controller itself.

The fact that the cruise control system supplies the internal combustion engine with a constant mass flow of fuel if the motor vehicle is traveling over a positive gradient or a level surface means that the cruise controller has a fuel supply device or actuates a fuel supply device of the motor vehicle, in order to supply the internal combustion engine with the constant mass flow of fuel.

When the cruise control system is activated, the cruise control system assumes control of the supply of fuel to the internal combustion engine. The control over the supply of fuel to the internal combustion engine is therefore performed exclusively by the cruise controller when the cruise control system is activated. The fact that the instantaneous position of the accelerator pedal is detected when the cruise control system is activated means that the instantaneous position of the accelerator pedal is detected at that time when the driver of the motor vehicle transfers control over the supply of fuel to the internal combustion engine to the cruise control system by means of an input.

The disclosed method can be implemented cost-effectively by means of a pure software implementation in vehicle electronics of a motor vehicle which are present, and can therefore also be used as a retrofit solution. Alternatively, for the implementation of the method according to the invention it is possible to install additional electronic devices in a motor vehicle.

The motor vehicle can be, for example, a passenger car, truck or bus.

According to one advantageous refinement, the cruise controller supplies the internal combustion engine with a maximum mass flow of fuel if the motor vehicle is traveling over a negative gradient and if an instantaneous speed of the motor vehicle is below a maximum speed which is permissible locally or predefined in some other way, and until the motor vehicle has reached the maximum speed, the cruise control system supplying the internal combustion engine with fuel starting from the time when the maximum speed is reached, in such a way that the motor vehicle maintains the maximum speed for as long as the motor vehicle travels over the negative gradient. In this context, the gravitational force acting on the motor vehicle is used to accelerate the motor vehicle to the maximum speed (which is permissible locally or predefined in some other way). As a result of this use of potential energy of the motor vehicle to accelerate the motor vehicle, the consumption of fuel for accelerating the motor vehicle to the maximum speed is reduced. As a result of the motor vehicle driving at the maximum speed, lost time caused by slowed-down driving with the motor vehicle on a positive gradient is possibly at least partially compensated for.

According to a further advantageous refinement, the cruise control system interrupts the supply of fuel to the engine if, subsequently to the negative gradient, the motor vehicle travels over a level surface, and until the motor vehicle has reached an instantaneous speed which can be maintained with the constant mass flow of fuel. As a result of the interruption of the supply of fuel to the internal combustion engine, the consumption of fuel of the motor vehicle is reduced and the inertia of the motor vehicle is used to propel the motor vehicle until the motor vehicle has reached an instantaneous speed which can be maintained with the constant mass flow of fuel. The instantaneous speed of the motor vehicle which can be maintained with the respective constant mass flow of fuel can be stored electronically in the cruise control system and compared with the actual instantaneous speed of the motor vehicle, in order to be able to determine whether the actual instantaneous speed of the motor vehicle has reached the stored instantaneous feed.

According to a further advantageous refinement, the maximum speed may be detected in an autonomous electronic manner or may be set by means of an input unit. The respective maximum speed can be detected electronically by the cruise control system. For this purpose, the cruise control system can be supplied, for example by means of a navigation system or an optical detection device of the motor vehicle, with corresponding information relating to the maximum speed which is respectively permissible locally. Alternatively, or additionally, the maximum speed which is respectively permissible locally can be set by a driver by means of an input unit of the motor vehicle or the cruise control system. The maximum speed which is predefined in other ways can be set by the driver by means of the input unit if no maximum speed which is permissible locally is predefined.

A cruise control system disclosed herein for a motor vehicle with an internal combustion engine comprises at least one device for detecting whether the motor vehicle is traveling over a positive gradient, a negative gradient or a level surface, the cruise control system being configured to supply the internal combustion engine with a constant mass flow of fuel if the motor vehicle is traveling over a positive gradient or a level surface. Furthermore, the cruise control system comprises at least one means for detecting an instantaneous position of an accelerator pedal of the motor vehicle, the cruise control system being configured to set the constant mass flow of fuel as a function of or based on a position of the accelerator pedal which is detected when the driver activates the cruise control system.

The advantages mentioned above with respect to the method are correspondingly associated with the cruise control system. In particular, the cruise control system can be used to carry out the method according to one of the abovementioned refinements or any desired combination of at least two of these refinements. The device for detecting whether the motor vehicle is traveling over a positive gradient, a negative gradient or a level surface and/or the means for detecting an instantaneous position of an accelerator pedal of the motor vehicle can be formed at least partially by the vehicle electronics which are present and/or a vehicle sensor system which is present.

According to one advantageous refinement, the cruise control system is configured to supply the internal combustion engine with a maximum mass flow of fuel if the motor vehicle is traveling over a negative gradient and if an instantaneous speed of the motor vehicle is below a maximum speed which is permissible locally, and until the motor vehicle has reached the maximum speed, and to supply the internal combustion engine with fuel starting from the time when the maximum speed is reached, in such a way that the motor vehicle maintains the maximum permissible speed for as long as the motor vehicle travels over the negative gradient. The advantages which are mentioned above with respect to the corresponding refinement of the method are correspondingly associated with this refinement.

According to a further advantageous refinement, the cruise control system is configured to interrupt the supply of fuel to the internal combustion engine if, subsequent to the negative gradient, the motor vehicle travels over a level surface, and until the motor vehicle has reached an instantaneous speed which can be maintained with the constant mass flow of fuel. The advantages which are mentioned above with respect to the corresponding refinement of the method are correspondingly associated with this refinement.

According to a further advantageous refinement, the cruise control system is configured to detect the maximum speed electronically. The advantages which are mentioned above with respect to the corresponding refinement of the method are correspondingly associated with this refinement.

According to a further advantageous refinement, the cruise control system comprises at least one input unit operable by a vehicle driver to set the maximum speed. The advantages which are mentioned above with respect to the corresponding refinement of the method are correspondingly associated with this refinement.

According to a further advantageous refinement, the cruise control system is configured to operate in an alternative mode in which fuel is supplied to the engine in such a way that the motor vehicle maintains an instantaneous speed detected at the time at which the driver activates the cruise control system. As a result, depending on the demand, the driver can select between the operation of the cruise control system based on the instantaneous position of the accelerator pedal and the operation of the cruise control system based on a set target speed.

Overall, with the invention the consumption of fuel of a motor vehicle may be reduced overall in comparison with a motor vehicle whose cruise controller adjusts the instantaneous speed exclusively to a set target speed.

Below, the invention is explained by way of example with reference to the appended figures and on the basis of preferred embodiments, the features which are mentioned below being able to constitute an advantageous or developing aspect of the invention either when each is considered independently or considered in a different combination. In the drawings:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
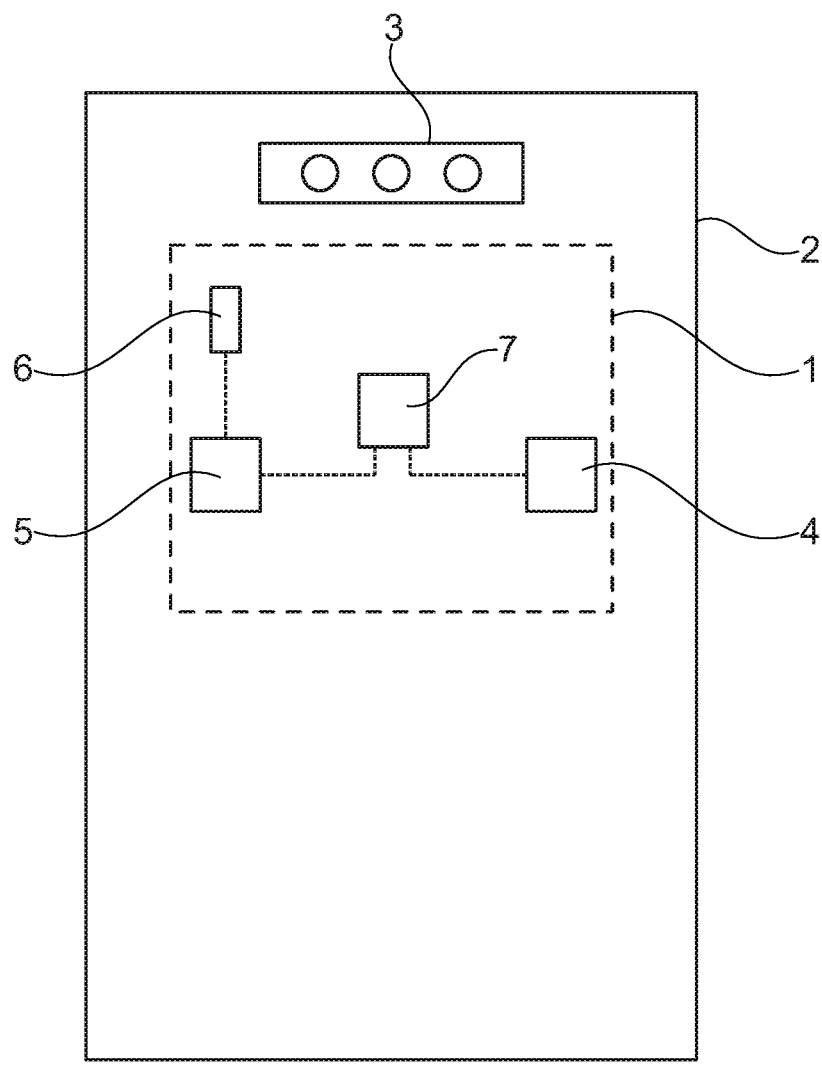
FIG. 1 shows a schematic illustration of an exemplary embodiment for a cruise control system according to the invention.

FIG. 1 shows a schematic illustration of an exemplary embodiment for a cruise control system 1 according to the invention for a motor vehicle 2 with an internal combustion engine 3.

The cruise control system 1 comprises an inclinometer 4 for detecting whether the motor vehicle 2 is traveling over a positive gradient, a negative gradient or a level surface. The cruise control system 1 is configured to supply the internal combustion engine 3 with a constant mass flow of fuel if the motor vehicle 2 is traveling over a positive gradient or a level surface.

Furthermore, the cruise control system 1 comprises a pedal position detector 5 for detecting an instantaneous position of an accelerator pedal 6 of the motor vehicle 2. The cruise control system 1 is configured to set the constant mass flow of fuel based on a position of the accelerator pedal 6 which is detected at the time of activation of the cruise control system 1.

The cruise control system 1 is configured to supply the internal combustion engine 3 with a maximum mass flow of fuel if the motor vehicle 2 is traveling over a negative gradient and if an instantaneous speed of the motor vehicle 2 is below a maximum speed which is locally permissible or predefined in some other way (hereinafter referred to as the maximum speed), and until the motor vehicle 2 has reached the maximum speed, and to supply the internal combustion engine 3 from the time when the maximum speed is reached with fuel, in such a way that the motor vehicle 2 maintains the maximum speed for as long as the motor vehicle 2 is traveling over the negative gradient.

The cruise control system 1 is additionally configured to interrupt the supply of fuel to the internal combustion engine 3 if, subsequent to the negative gradient, the motor vehicle 2 travels over a level surface, and until the motor vehicle 2 has reached an instantaneous speed which can be maintained with the constant mass flow of fuel.

The cruise control system 1 can be configured to detect the maximum speed electronically. Alternatively, or additionally, the cruise controller 1 can have an input unit operable by the driver for setting the maximum speed.

In addition, the cruise control system 1 is configured to operate in an alternative mode in which fuel is supplied to the internal combustion engine 3 in such a way that the motor vehicle 2 maintains an instantaneous speed which is detected at the time at which the driver activates the cruise control system.

The cruise control system 1 comprises an electronic processor 7 which is connected to the inclinometer 4 and to the pedal position detector 5, in order to be able to carry out the above functionalities of the cruise control system 1.

Figure 2:
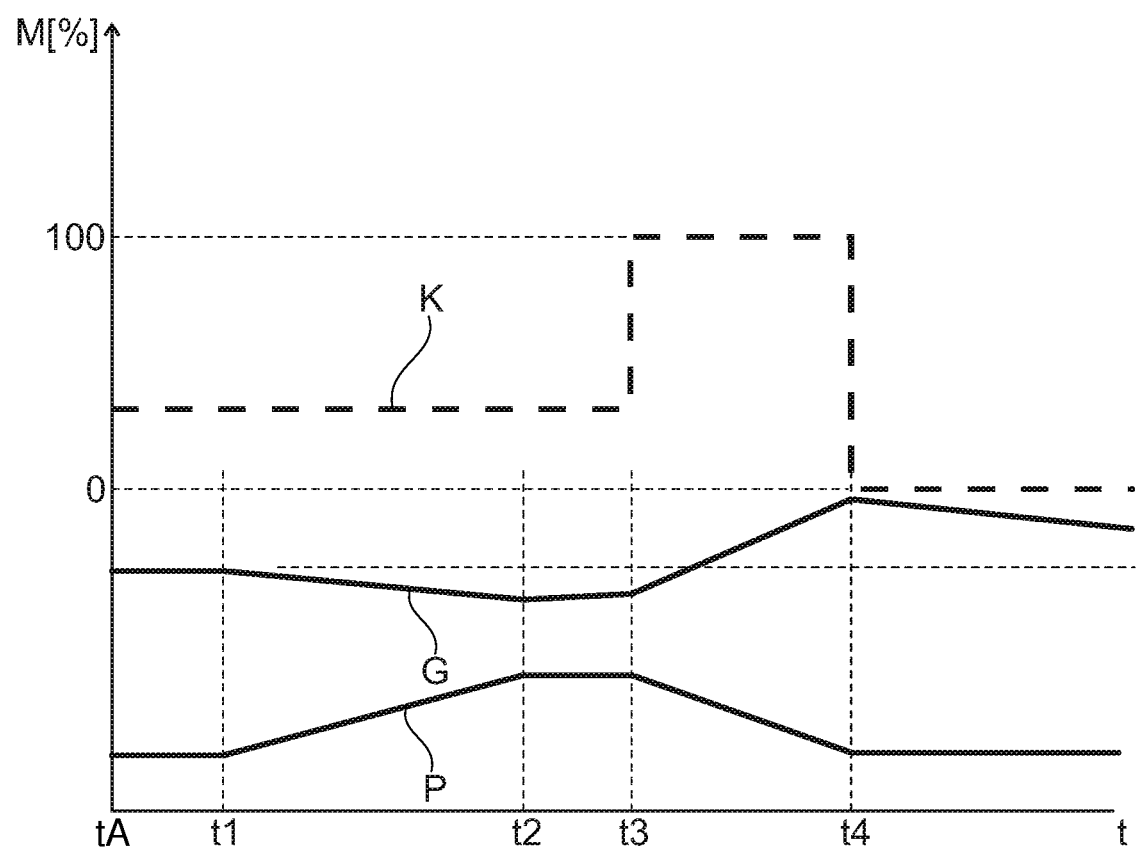
FIG. 2 shows a diagram of an exemplary embodiment for a method according to the invention.

FIG. 2 shows a diagram relating to an exemplary embodiment of a method for operating a motor vehicle with an internal combustion engine and a cruise control system. The cruise control system may be embodied according to FIG. 1.

In the lower region of the diagram, a surface profile P of a surface on which the motor vehicle is traveling is shown. Above it, a speed profile G of the speed of the motor vehicle is shown. Above that, a profile K of the supply of fuel to the internal combustion engine is shown. A mass flow M of fuel supplied to the internal combustion engine is plotted in percentage values against the time t.

According to the method, it is electronically detected by an inclinometer whether the motor vehicle is traveling over a positive gradient (uphill), a negative gradient (downhill) or a level surface. Up to the time t1, the motor vehicle is traveling over a level surface. From the time t1 to the time t2 the motor vehicle is traveling over a positive gradient. From the time t2 to the time t3 the motor vehicle is traveling over a level surface. As shown in FIG. 2, the cruise control system supplies the internal combustion engine with a constant mass flow of fuel if the motor vehicle is traveling over a positive gradient or a level surface. For this purpose, according to the method an instantaneous position of an accelerator pedal of the motor vehicle is detected at the time tA at which the cruise controller system is activated by the driver, and the constant mass flow of fuel is set as a function of or based on a position of the accelerator pedal at that time of activation tA.

From the time t3 to time t4 the motor vehicle is traveling over a negative gradient. Here, the cruise control system supplies the internal combustion engine with a maximum mass flow of fuel if, as assumed in FIG. 2, an instantaneous speed of the motor vehicle is below the maximum speed (which is permissible locally or predefined in some other way), and until the motor vehicle has reached the maximum speed. As a result, the speed of the motor vehicle increases. The cruise control system can supply the internal combustion engine with fuel starting from the time when the maximum speed is reached, in such a way that the motor vehicle maintains the maximum speed for as long as the motor vehicle is traveling over the negative gradient, which is, however, not shown in FIG. 2. The maximum speed can be detected in an autonomous electronic manner or be set by means of an input unit.

Starting from the time t4, the motor vehicle is again traveling over a level surface. At the time t4 the cruise control system interrupts the supply of fuel to the internal combustion engine since, subsequent to the negative gradient, the motor vehicle is traveling over a level surface. As a result, the speed of the motor vehicle decreases. The cruise control system can interrupt the supply of fuel to the internal combustion engine until the motor vehicle has reached an instantaneous speed which can be maintained with the constant mass flow of fuel. The instantaneous speed of the motor vehicle which can be maintained with the respective constant mass flow of fuel can be stored electronically in the cruise control system and compared with the actual instantaneous speed of the motor vehicle, in order to be able to determine whether the actual instantaneous speed of the motor vehicle has reached the stored instantaneous feed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cruise control system for controlling fuel supplied to an engine of a motor vehicle comprising:
    a sensor for detecting a position of an accelerator pedal of the vehicle;
    an inclinometer for detecting a gradient of a surface over which the vehicle is traveling; and
    an electronic processor operative to set fuel flow rate at a first mass flow as a function of the accelerator pedal position detected at an activation time of the cruise control system, and to maintain the fuel flow rate at the first mass flow if the vehicle is travelling on a positive gradient or a level surface such that a speed of the vehicle varies with gradient with the speed of the vehicle being maintained on the level surface, and the speed of the vehicle decreasing on the positive gradient.

2. The cruise control system of claim 1, wherein the electronic processor is further operative to:
    supply the engine with a maximum fuel flow that is greater than the first mass flow if a) the vehicle is traveling over a negative gradient and b) an instantaneous speed of the motor vehicle is below a maximum speed such that the speed of the vehicle increases towards the maximum speed while on the negative gradient; and
    supply the engine with fuel at a reduced flow rate after the vehicle reaches the maximum speed, such that the vehicle maintains the maximum speed as the vehicle continues on the negative gradient.

3. The cruise control system of claim 2, wherein the electronic processor is further operative to:
    interrupt fuel flow to the engine if, subsequent to the negative gradient, the vehicle travels over a level surface; and
    resume supplying fuel to the engine at the first mass flow when the vehicle reaches an instantaneous speed which can be maintained with the first mass flow.

4. The cruise control system of claim 2, wherein the electronic processor is configured to detect the maximum speed electronically based on a predefined speed associated with a roadway.

5. The cruise control system of claim 2, further comprising an input unit operable by a driver to set the maximum speed.

6. The cruise control system of claim 1, wherein the electronic processor is further operative in an alternative mode wherein fuel is supplied to the engine such that the vehicle maintains an instantaneous speed detected at activation time of the cruise control system as a constant speed by varying a fuel flow rate to the engine.

7. Apparatus comprising:
    a sensor for detecting a position of an accelerator pedal of a motor vehicle al an activation time;
    an inclinometer for detecting a gradient of a surface over which the motor vehicle is traveling; and
    an electronic processor operative to set a fuel flow rate to an engine based on the position, and maintain the fuel flow rate at a constant value if the vehicle travels on a positive gradient or a level surface such that a speed of the vehicle varies with gradient with the speed of the vehicle being maintained on the level surface, and the speed of the vehicle decreasing on the positive gradient.

8. The apparatus of claim 7, wherein the electronic processor is further operative to:
    supply the engine with a maximum fuel flow greater than the constant value such that the speed of the vehicle increases if a) the vehicle is traveling over a negative gradient and b) an instantaneous speed of the motor vehicle is below a maximum speed; and
    supply the engine with fuel at a reduced flow rate after the vehicle reaches the maximum speed, such that the vehicle maintains the maximum speed as the vehicle continues on the negative gradient.

9. The apparatus of claim 8, wherein the electronic processor is further operative to:
    interrupt fuel flow to the engine if, subsequent to the negative gradient, the vehicle travels over a level surface; and
    resume supplying fuel to the engine at the constant value when the vehicle reaches an instantaneous speed which can be maintained with the constant value for the fuel flow rate.

10. The apparatus of claim 8, wherein the electronic processor is configured to detect the maximum speed electronically as a predetermined speed associated with a roadway.

11. The apparatus of claim 8, further comprising an input unit operable by a driver to set the maximum speed.

12. The apparatus of claim 7, wherein the electronic processor is further operative in an alternative mode wherein fuel is supplied to the engine such that the vehicle maintains an instantaneous speed detected at the activation time as a constant speed by varying fuel flow to the engine.

13. A cruise control system for controlling fuel supplied to an engine of a motor vehicle comprising:
    a processor operative to set a fuel flow rate as a function of an accelerator pedal position detected by a pedal position detector at an activation time, and maintain the fuel flow rate at a constant value while allowing a speed of the vehicle to vary if an inclinometer detects that the vehicle is travelling on a positive gradient or a level surface such that the speed of the vehicle decreases on the positive gradient.

14. The cruise control system of claim 13, wherein the processor is further operative to:
    supply the engine with a maximum fuel flow greater than the constant value such that the speed of the vehicle increases if a) the vehicle is traveling over a negative gradient and b) an instantaneous speed of the motor vehicle is below a maximum speed; and supply the engine with fuel at a reduced flow rate after the vehicle reaches the maximum speed, such that the vehicle maintains the maximum speed as a constant speed as the vehicle continues on the negative gradient.

15. The cruise control system of claim 14, wherein the processor is further operative to:

interrupt fuel flow to the engine if, subsequent to the negative gradient, the vehicle travels over a level surface such that the vehicle speed decreases; and resume supplying fuel to the engine at the constant value of the fuel flow rate when the vehicle reaches an instantaneous speed which can be maintained with the fuel flow rate on the level surface.

16. The cruise control system of claim 14, wherein the processor is configured to detect the maximum speed electronically based on a predetermined speed for a roadway.

17. The cruise control system of claim 14, further comprising an input unit operable by a driver to set the maximum speed.

18. The cruise control system of claim 13, wherein the processor is further operative in an alternative mode wherein fuel is supplied to the engine at a variable rate such that the vehicle maintains an instantaneous speed as a constant speed detected at the activation time.

* * * * *